United States Patent
McIsaac et al.

(10) Patent No.: US 8,850,555 B2
(45) Date of Patent: *Sep. 30, 2014

(54) SYSTEM AND METHOD FOR CONTROLLING ACCESS TO AN ELECTRONIC MESSAGE RECIPIENT

(75) Inventors: Joseph E. McIsaac, Burlington, MA (US); Marcus Dahllof, Philadelphia, PA (US); Bruce L. Tatarsky, Nashua, NH (US); Richard K. Vallett, Wilmington, MA (US)

(73) Assignee: Reflexion Networks, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,703

(22) Filed: Jul. 3, 2012

(65) Prior Publication Data

US 2013/0007896 A1 Jan. 3, 2013

Related U.S. Application Data

(63) Continuation of application No. 12/909,351, filed on Oct. 21, 2010, now Pat. No. 8,239,471, which is a continuation of application No. 10/523,760, filed as application No. PCT/US03/25067 on Aug. 11, 2003, now Pat. No. 7,870,260.

(60) Provisional application No. 60/402,574, filed on Aug. 9, 2002.

(51) Int. Cl.
*H04L 29/06* (2006.01)
*H04L 12/58* (2006.01)
*H04L 29/12* (2006.01)

(52) U.S. Cl.
CPC ............. *H04L 63/10* (2013.01); *H04L 51/28* (2013.01); *H04L 51/12* (2013.01); *H04L 63/102* (2013.01); *H04L 61/301* (2013.01); *H04L 63/0254* (2013.01); *H04L 29/12594* (2013.01); *H04L 61/307* (2013.01)
USPC ............................. 726/12; 709/225; 713/154

(58) Field of Classification Search
CPC ................. H04L 63/0254; H04L 63/0281
USPC ............................................................ 726/28
See application file for complete search history.

(56) References Cited

U.S. PATENT DOCUMENTS

| | | | |
|---|---|---|---|
| 5,930,479 A * | 7/1999 | Hall | 709/238 |
| 5,999,932 A | 12/1999 | Paul | |
| 6,112,227 A | 8/2000 | Heiner | |
| 6,199,102 B1 | 3/2001 | Cobb | |
| 6,377,993 B1 | 4/2002 | Brandt et al. | |
| 6,643,687 B1 * | 11/2003 | Dickie et al. | 709/206 |

(Continued)

FOREIGN PATENT DOCUMENTS

| | | |
|---|---|---|
| JP | 2000339236 A | 12/2000 |
| JP | 2002073475 A | 3/2002 |
| WO | 98/18249 A1 | 4/1998 |
| WO | 01116695 A1 | 3/2001 |

*Primary Examiner* — Hadi Armouche
*Assistant Examiner* — Bryan Wright
(74) *Attorney, Agent, or Firm* — Burns & Levinson, LLP; Joseph M. Maraia

(57) ABSTRACT

A system for, and method of, generating a plurality of proxy identities to a given originator identity as a means of providing controlled access to the originator identity in electronic communications media such as e-mail and instant messaging.

11 Claims, 11 Drawing Sheets

(56) References Cited

U.S. PATENT DOCUMENTS

| | | |
|---|---|---|
| 6,941,348 B2 | 9/2005 | Petry et al. |
| 6,985,479 B2 * | 1/2006 | Leung et al. ............... 370/352 |
| 7,058,684 B1 | 6/2006 | Ueda |
| 7,092,942 B2 * | 8/2006 | Frieden et al. ................. 1/1 |
| 7,472,422 B1 | 12/2008 | Agbabian |
| 7,698,433 B2 | 4/2010 | Gallant |
| 7,783,741 B2 | 8/2010 | Hardt |
| 2002/0032853 A1 * | 3/2002 | Preston et al. ............... 713/151 |
| 2002/0152272 A1 | 10/2002 | Yairi |
| 2003/0051057 A1 * | 3/2003 | Garnett et al. ............... 709/249 |
| 2003/0158960 A1 | 8/2003 | Engberg |
| 2004/0003041 A1 | 1/2004 | Moore et al. |
| 2004/0123153 A1 | 6/2004 | Wright et al. |
| 2005/0038893 A1 | 2/2005 | Graham |
| 2007/0083425 A1 | 4/2007 | Cousineau et al. |

* cited by examiner

*Address Translations*

"True" Identifiers (UE_True table) /500
- T1 = Inside Identifier 1
- T2 = Outside Identifier 1
- T3 = Outside Identifier 2
- T4 = Inside Identifier 2
- T$n$ = Outside Identifier $n$

Proxy Identifiers (UE_Alias table) /502
- $P_{(T2,T1)}$ = Substitute identifier for T1, registered to T2
- $P_{(T3,T1)}$ = Substitute identifier for T1, registered to T3
- $P_{(Tn,T1)}$ = Substitute identifier for T1, registered to T$n$ $P_{(Tx,Tx)}$ = Tx, registered to Tx $s$ = sender identity
$r$ = recipient identity
$a$ = An address reference to translate
$M(s,r)$ = A message from $s$ to $r$ /504
$T(a)$ = Method that returns translation of address $a$ for a message from $s$ to $r$
$D_{(Tx,T1)}$ = Method that returns proxy P that Tx uses to send e-mail to T1
506  Sometimes $D_{(Tx,T1)} <> P_{(Tx,T1)}$ INBOUND, Successfully past security, where:

1. $a = r$, $s = T2$, $r = P_{(T2,T1)}$, then $T(a) = T1$

2. $a = r$, $s = T2$, $r = P_{(T3,T1)}$, then $T(a) = T1$

3. $a = P_{(T4,T4)}$, $s = T2$, $r = P_{(T2,T1)}$, then $T(a) = T4$

4. $a = P_{(T4,T4)}$, $s = T2$, $r = P_{(T3,T1)}$, then $T(a) = T4$

5. $a = T3$, $s = T2$, $r = P_{(Tx,T1)}$, then $T(a) = T3$

6. $a = P_{(Tx,Ty)}$, $s = T2$, T2 is exempt, $r$ = any P, then $T(a) = Ty$

OUTBOUND, no security on outbound, where:

7. $a = r$, $s = T1$, $r = T2$, then $T(a) = P_{(T2,T1)}$

8. $a = r$, $s = T1$, $r = T2$, $D_{(T2,T1)} <> P_{(T2,T1)}$, then $T(a) = D_{(T2,T1)}$ 9. $a = r$, $s = T1$, $r = T2$, $D_{(T2,T1)} = P_{(T2,T1)}$, then $T(a) = P_{(T2,T1)}$ 10. $a = r$, $s = T1$, $r = T2$, $r$ is exempt, then $T(a) = P_{(T1,T1)}$ [$s$]

11. $a = T3$, $s = T1$, $r = T2$, then $T(a) = P_{(T3,T1)}$

12. $a = T3$, $s = T1$, $r = T2$, $D_{(T3,T1)} <> P_{(T3,T1)}$, then $T(a) = D_{(T3,T1)}$ 13. $a = T3$, $s = T1$, $r = T2$, $D_{(T1,T2)} = P_{(T2,T1)}$, then $T(a) = P_{(T3,T1)}$ 14. $a = T3$, $s = T1$, $r = T2$, T3 is exempt, then $T(a) = P_{(T1,T1)}$ [$s$]

FIG. 5

Login Page

Reflexion

|Contacts |Options |History |Reflected |Logout
|Password |Reports

User

Contact Details

Unnamed <sonya@tyr.cs.brandeis.edu>

Name: Sonya Aronin  sonya.nov@rfxtech.com  11:26:54
Address: sonya@tyr.cs.brandeis.edu  ☐ Name-on-the-fly (sonya.nov.new@rfxtech.com)

Security Status
○ Public
○ Protected
○ No sharing
○ Disabled

Exemptions
☐ Single address exempted from Reflexion
☐ The domain tyr.cs.brandeis.edu exempted from Reflexion Message Activity
12.20.57 Inbound to own unique, Subj: Advanced Footer
12.19.39 Inbound to own unique, Subj: Standard Footer
11.29.10 To this No Share address; used by sonya@tyr.cs.brandeis.edu View all history

[Save] [Reset]

Contact Details Page

FIG. 8

Reflexion

|Contacts |Options |History |Reflected |Logout
|Password |Reports

Options

User Properties

Your Name: [Sonya Aroin]

E-mail Address: sonya@rfxtech.com (View properties)

Prefix: [Sonya]

Reflexion Properties

Mode: ● Enforce
○ Flag
○ Pass through
○ Reverse

☒ Keep copies of reflected messages
☒ Append security codes to address

☐ Auto exempt on reply to flagged msgs

Message Footer: ○ Standard
● Advanced
○ No footer

[Save] [Delete] [Reset]

Reflexion User Options Page

FIG. 9

Global Exemptions

Exempt a Domain or Address

Enter a valid e-mail address: [        ]

⊙ Exempt the address
○ Unexempt the address

○ Exempt the entire domain
○ Unexempt the entire domain   (View Exempts)

[Submit] [Reset]

Administrator Add a Global Exemption Page

FIG. 10

Reflexion

|New User  |Exempts  |History  |Reports  |Logout

New User

Enter the Name and Business Card Address (BCA) of the New User

Name: [          ]
Business Card Address: [       ]@[rfxtech.com ▶]

Enter Additional Addresses that are linked to the BCA, such as old addresses that are still used.

Additional Address 1: [       ]@[rfxtech.com ▶]
Additional Address 2: [       ]@[rfxtech.com ▶]
Additional Address 3: [       ]@[rfxtech.com ▶]

User Type:   ○ Domain Group Administrator   ⊙ Normal User

[Create]  [Reset]

Administrator Create New User Page

FIG. 11

SYSTEM AND METHOD FOR CONTROLLING ACCESS TO AN ELECTRONIC MESSAGE RECIPIENT

RELATED APPLICATIONS

This application is a continuation of U.S. patent application Ser. No. 12/909,351 filed Oct. 21, 2010, now U.S. Pat. No. 8,239,471 entitled, "System and Method for Controlling Access to an Electronic Message Recipient," which is a continuation of U.S. patent application Ser. No. 10/523,760 (now U.S. Pat. No. 7,870,260) filed Jan. 30, 2006, entitled, "System and Method for Controlling Access to an Electronic Message Recipient," which is a 371 patent application of PCT/US03/25067 filed Aug. 11, 2003, entitled, "System and Method for Controlling Access to an Electronic Message Recipient," which claims priority to U.S. Provisional Application Ser. No. 60/402,574 filed Aug. 9, 2002.

TECHNICAL FIELD OF THE INVENTION

The present invention is directed, in general, to computer networks and, more specifically, to a system and method for controlling access control over forms of electronic communications (e.g. "electronic mail", "instant messaging") where messages are directed between participants using sender and recipient identifiers.

BACKGROUND OF THE INVENTION

The great strength of electronic mail ("e-mail") is the universal use of standard protocols that define the content and delivery of e-mail messages. Unfortunately, these standard protocols do not authenticate sender identities, making access control over e-mail a difficult proposition. In recent years, the lack of access control over e-mail has led to dramatic increases in the volume of commercial and other undesired messages ("spam").

For over ten years, there have been hundreds of attempts to create a software system to control access to e-mail inboxes.

At the time of this application filing, it is a widely held belief that existing anti-spam technologies fail to solve the spam problem in e-mail, to the extent that there are predictions that spam has put the medium in jeopardy of becoming unusable.

The most common approach is what is collectively known as "spam filtering". Spam filters attempt to determine whether or not a message is desired based on an assessment of its content, the identity of the sender, or some other characteristic of the message.

Filters tend to suffer from one or several common deficiencies. Filters frequently miss spam messages and allow their delivery and also incorrectly identify legitimate messages as spam ("false positive"). It's problem enough to miss significant numbers of spam, but blocking legitimate messages is simply intolerable for most users, especially in business where the filtered message could be of critical importance.

Filters are easily bypassed since the properties on which filters depend to identify spam are frequently under the control of the sender (e.g. sender's identity, subject, message content).

Rules-based filters require ongoing maintenance of the rules by users and administrators. Filters can be computationally expensive, as each message much be processed through all of the rules leading to latency in message delivery.

A second approach to limiting access over electronic communications is to deny all access other than from authenticated sources, a technique typically known as "white listing". It's a system that allows messages to arrive "by invitation only".

When a message is sent to a white list-protected e-mail address, the message is delivered only if the sender's identity is found on the white list. Messages from senders not on the white list are rejected, quarantined as suspect spam, or most-commonly, challenged. Each rejection behavior introduces it's own aggravation and disruption to legitimate communications.

White listing works because most spam senders do not want to receive reply messages, so message-based challenges mostly arrive to legitimate message senders only.

Changes to the underlying e-mail protocols will not bring relief. The IETF (the body that defines and supports the RFC e-mail standards) already defined an authentication extension to standard e-mail communications in 1999 called ESMTP. Yet even though ESMTP has been with us for four years, few if any mail hosts require the use of ESMTP by senders because to do so would be to deny the vast majority of messages sent with universal non-authenticated standard (SMTP). So no one will move to the ESMTP standard until everyone does, resulting in a continued and permanent dependency on SMTP.

Commercial schemes that try to put a monetary control system (e.g. pay-per-message e-mail and bonded e-mail) over e-mail or that try to draw from legal intellectual property protection (e.g. trademarked poetry in message headers) require too much setup and follow-up aggravation to be acceptable to the majority of users.

The key insight that led to the present invention was accepting that it is very difficult, if not impossible, to design a system that separates all desired from undesired messages when mixed in a single collection. The numerous attempts that attempted to do so have not delivered complete protection against spam without blocking legitimate messages.

The solution resides in a system or method that can be adopted unilaterally by a user or enterprise that prevents desired and undesired messages from being mixed in the same collection.

SUMMARY OF THE INVENTION

The present invention (the "product") provides systems, computer program products residing on computer readable medium (the computer readable medium does not include a transitory signal), and methods for controlling access in forms of electronic communications (e.g. "electronic mail", "instant messaging") where messages are directed between participants using sender and recipient identifiers, through the establishment and management of a plurality of proxy identifiers ("the proxies") that serve as substitutes to a protected original identifier ("the originator"), each of which proxies having a discrete security state defining access rights that correspond to the portion of the messaging community dependent on it for communications with the originator ("the contacts").

In every embodiment of the present invention, there are at least three security states, and in many embodiments many more than three, that control the manner in which proxy identifiers (e.g. e-mail addresses) are restrictive of access to the destination identifier during the delivery of messages, are created, and are substituted for references to the source identifier in the message.

In one embodiment of the present invention, the system supports multiple (i.e. more than three) security settings that collectively interact with each other, resulting in a matrix of discrete security states and corresponding behaviors. The diversity of security states in this embodiment provides system behavior that is more precise than, for example, a binary state system where access is either allowed or disallowed. In this and other embodiments, certain communities of users can be permitted access where others cannot, even in messages sent to the same destination identifier. For access control, messages can be denied, challenged, quarantined or accepted, and each with variations.

In one embodiment of the present invention, proxy e-mail addresses may be defined in a variety of manners, including automatic creation and assignment by the product as messages are processed through the system, explicit creation and assignment by the enterprise or individual user, and implicit creation following a naming convention that predetermines the source e-mail address and initial security state.

In one embodiment of the present invention, references to proxy e-mail addresses can be either translated or not translated to the corresponding source address, depending on the security state. For example, references to proxy identifiers that were created automatically by the product are replaced by the source identifier throughout the message. Explicitly created proxy addresses or defined via a naming convention (and are thus known to the user) are not replaced by the source identifier.

DESCRIPTION OF THE FIGURES

For a more complete understanding of the present invention, here is a brief description of the accompanying figures.

FIG. 5 is a table of formulas that describe the various address translation results depending on the context of messages (i. e. who is sending the message, using what proxy, and to whom) and various security settings.

DETAILED DESCRIPTION

Figure 1:
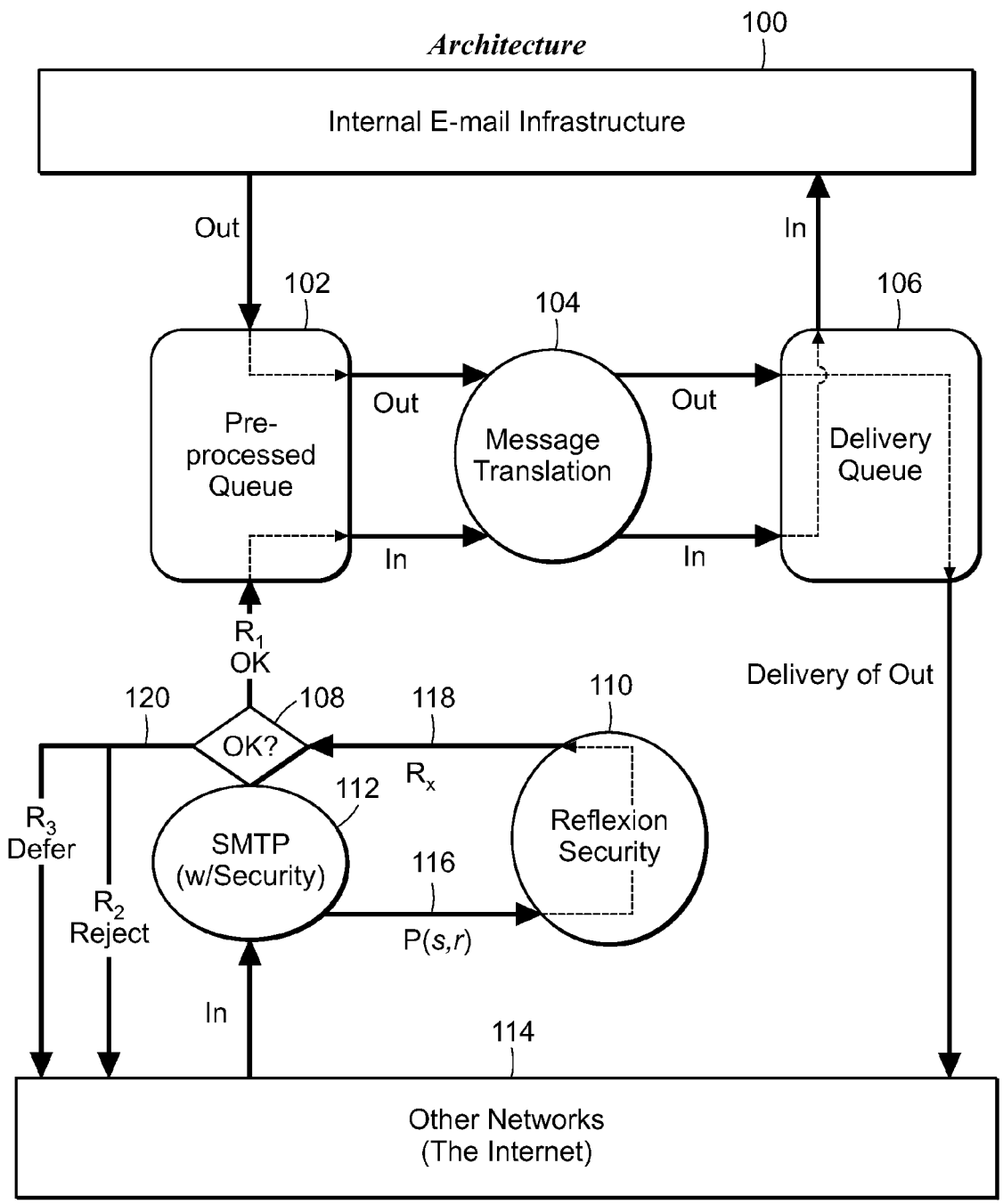
FIG. 1 illustrates a high-level block diagram of the architecture of the preferred embodiment of the present invention.

The product is comprised of three systems:
1. Reflexion Mail Server (RMS)
2. The Administration Web Site (AWS)
3. Database server The three systems can reside on a single server or be clustered in a variety of configurations on multiple servers.

About the Reflexion Mail Server

It is a requirement of the invention that all external messages to and from the originator pass through the product. Messages from the originator to an external recipient ("contact") are herein called "outbound messages"; messages from an external sender (also a "contact") to the originator are herein called "inbound messages".

The Reflexion Mail Server ("RMS") employs two storage queues, one in which in-bound traffic messages reside until the Security Module processes them (the "pre-processed queue"), and a second wherein processed messages and bounce messages are placed for final delivery (the "delivery queue").

The sender and recipient e-mail addresses specified in the transport envelope of the SMTP delivery are the keys for the Security Module. The Security Module determines, based on a combination of interacting security states as defined hereinafter, whether or not the message should be delivered to the intended recipient.

A variety of error messages and warnings can be sent back to the sender if warranted.

Messages that are delivered typically have a footer attached to the bottom of the message by the RMS with a link to the Reflexion Wizard, a polymorphic browser interface that serves as the user's primary interface to the product.

The Reflexion Mail Server also manages the creation and use of the arrays of proxy identifiers that is the core security apparatus of the invention.

Proxy Addresses

Each contact is assigned one or more proxy addresses, each of which is a RFC-compliant email addresses (i.e. addresses compatible with the naming conventions of the most common e-mail protocols, see The Internet Engineering Task Force for more information on e-mail protocols). In the context of this application, "proxy identifier" is synonymous with "proxy address".

Each contact is assigned its own proxy address on first reference as either the sender or recipient in a message passing through the RMS. The product controls access to the infrastructure based on enterprise and user preferences and defaults, stored as properties on each security code.

Following a message from an originator to an external contact:

1. An outbound message is processed through the existing e-mail infrastructure of the host enterprise and arrives at the product embodying the invention.

2. The product automatically assigns and records a unique proxy address as being registered for use by the contact. If a proxy address had previously been assigned to the contact, it will be reused.

3. All references to the originator's address in the header and body of the outbound message are changed to corresponding proxy address. For example, a message from the originator address: From: ssmith@company.com is sent to an outside contact. As the message passes through the product, all references to the originator address ssmith@company.com are changed to the proxy address that corresponds to the recipient, which in this example is: From: ssmith.123@company.com When the message arrives in the contact's inbox, the message appears to have originated from the address ssmith.123@company.com (emphasis on the ".123"), not from ssmith@company.com.

In this example, the proxy address remains personalized to the originator's identity; the local part still has "ssmith" and the domain remains "company.com". In other embodiments, the proxy address could just as easily sustain no visible provenance from the originator address.

4. After altering references of the originator address to be the proxy address, the message is delivered as with any unaffected e-mail message.

Following a message sent from an external contact back to the originator via a proxy address:

1. An outbound message is sent to the proxy address by an external contact that ultimately arrives at the RMS.

2. The RMS Security Module determines the delivery disposition for the message based on the security state of the addresses involved, including but not limited to:

a. Message delivery denied, message offering no recourse to sender. End processing.

b. Message delivery denied, message offering new proxy to sender. End processing.

c. Message delivery accepted, message flagged as "suspect". Proceed to 3.

d. Message delivery accepted without reservation. Proceed to 3.

3. For messages authorized for delivery, all references to proxy addresses in the header and body of the inbound message are changed to corresponding originator's address. To continue the example, a message to the proxy address: To: ssmith.123@company.com When the message arrives in the contact's inbox, the message appears to have been sent from the external contact to the originator's address ssmith@company.com.

In this manner, proxy addresses on inbound messages are not exposed in the final delivery, making the mechanics of the access control protocol transparent to the user.

Users can disable or restrict the use of one security code without affecting any other.

Access control is difficult to circumvent because the security settings reside on the e-mail address itself, so it doesn't matter who the sender says that they are, or what they place in the message, the address itself will no longer work once disabled.

About the Administration Web Site

The Administration Web Site ("AWS") provides a full-control, full-disclosure interface to the proxy arrays, security settings and traffic history.

The AWS is built on a three-tier architecture:

1. Java Server Pages and Servlets
2. Database Server
3. Application Server

The server pages define the application interface, update and request data from the Database Server, and construct result pages and forms that are served to the user's browser by the Application Server.

Within the interface defined in the server pages and servlets, there are a number of application-specific objects.

Users

Access to the overall AWS requires success authentication of the user's credentials. In the preferred embodiment, the AWS requires a successful login using a user ID and corresponding password.

Authentication and credential requirements are enforced on every page within the AWS.

There are three levels of users supported in the AWS, each having different access privileges:

1. Super Administrator—full access and the only user type that can access the server configuration and control methods. Access to overall traffic history details and summary.

2. Domain Group Administrator (DGA)—full access to the domain group itself, the users of the domain group, and the traffic history for domain group to which the DGA is assigned.

3. User—Access to the user's own options, proxy addresses and personal history.

| Property | Description |
| --- | --- |
| Login ID | Name or e-mail address used during login to the Administration Web Site |
| Password | Password used during login to the Administration Mode Web Site |
| Mode | Reflexion has different overall security modes by user:<br>1. Enforce - Denial and challenge messages are sent to senders when their messages cannot be delivered<br>2. Flag - Guarantees that all messages are delivered to the recipient. Messages that would be denied or challenged in Enforce Mode are instead "flagged" (i.e. given a visible indicator that the message would not have been delivered in Enforce Mode.<br>3. Pass Through - Messages to the recipient are to skip the Security Module altogether and go straight to delivery.<br>4. Reverse - Used to eliminate the dependency on proxy addresses, ostensibly in preparation for removal of the product. All security is dropped, and any message to a proxy address results in a request message being sent to the sender requesting that future messages to the recipient be sent on the original address. Messages are flagged on messages sent to a proxy address. |
| Footer | As messages pass through the product, the RMS attaches a footer to the bottom of each message. There are three types of footers available to each user:<br>1. Standard Footer - Contains single link that connects to the Reflexion Wizard.<br>2. Advanced Footer - Contains a great deal of additional information and links not found in the Standard Footer.<br>3. No Footer - The Footer is not required; this type turns it off. |
| Message Store | Option to keep copies of messages that denied or challenged. |
| Auto-Exempt | Option to automatically exempt contacts when the user replies to a flagged message from the contact. |

The Server

The Server object contains properties and methods that are specific to the entire installation of the product. The server object is available only to users with "super administrator" privileges.

Most of the properties are related to the behavior of the product as a generic mail server. These include settings for the queue life time, IP address of the Administration Web Site, database backup schedules, etc.

Domain Groups

Each Reflexion installation can support any number of enterprises. Enterprises are managed as a Domain Group on the product. A Domain Group can have any number of domains under management, any number of users with addresses at these domains, and any number of Domain Group Administrators (DGAs) managing the Domain Group.

Contacts

Reflexion catalogs all of the external contacts that either sent or received a message to or from the user. A contact is both a proxy address with security settings and a security profile of the contact to which it is registered.

| Property | Description |
| --- | --- |
| Contact Name | Name of the contact to which this contact's proxy address is registered. The Contact Name is parsed from inbound messages from the contact. |

| Property | Description |
| --- | --- |
| True Address | The contact's e-mail address (not to be confused with the proxy address assigned to the user). |
| Proxy Address | The Reflexion proxy address assigned to the Security Status contact by the RMS. |
| Security Status | Each proxy address has one of the following security status:<br>1. Public - This proxy can be used and shared by anyone and messages to it will be delivered.<br>2. Protected - Only "appropriate" contacts can use this proxy address, inappropriate contacts will be challenged (Enforce Mode) or their messages will be flagged (Flag Mode).<br>3. No Share - Only "appropriate" contacts can use this proxy address, inappropriate contacts will be denied (Enforce Mode) or their messages will be flagged (Flag Mode).<br>4. Disabled - No mail to this proxy address will be delivered (other than for exempt senders). |
| Message Store | Option to keep copies of messages that denied or challenged. |
| Auto-exempt | Option to automatically exempt contacts when the user replies to a flagged message from the contact. |
| Name-on-the-Fly (NOTF) | If enabled, allows new proxy addresses to be defined "on the fly" (i.e. without any interaction with the product) that are derivatives of this contact's proxy address. For example, if the proxy address of this contact is:<br>proxy@company.com<br>and NOTF is on, then the user can invent any new proxy address of the form:<br>proxy.new@company.com<br>where "new" is anything that the user wants. The NOTF proxy will be assigned to the first contact that uses it. |
| Life Span | Proxy addresses can be assigned a limited life span. When a proxy "expires", the security state is set to disabled. |

Exemptions

The system supports exemptions.

History

The product records descriptive information about each message that is sent in or out of the enterprise. The individual message history items are consolidated into totals for historical summary reporting and dropped after remaining online for a configurable length of time.

FIG. 1—Architecture for the Preferred Embodiment

The following is a legend corresponding to elements illustrated in FIG. 1:

Legend: s=sender identity
r=recipient identity
P(s,r)=Request security status on a message from s to r
$R_x$=Security status on a message from s to r
$R_1$=OK, continue processing message
$R_2$=Reject. Do not process the message
$R_3$=Defer, temporarily defer the message back to the sending server The Reflexion Mail Server employs 2 e-mail queues, one queue for in-bound traffic wherein messages reside until the Security Module processes them (the "pre-processed queue") 102, and a second queue wherein processed messages and bounce messages are placed for final delivery (the "delivery queue") 106.

Inbound messages (from either the mail server of the enterprise 100 or the mail server of the external contact 114) are received and stored in the inbound queue 102. Inbound messages from external sources 114 are subject to the product's security.

Security enforcement takes place during receipt of the inbound messages using the SMTP protocol 112. As soon as the transport envelope sender and recipient addresses are received, the SMTP protocol handler sends a request to the Reflexion Security Module 110 to obtain the security disposition for this message 116. Subsequent processing of the remainder of the incoming message is predicated on the security response 118 returned from the Reflexion Security module 108.

If the message can be delivered, it is deposited into the pre-processing queue 102. If the message cannot be delivered, either a deferral or denial 120 will be sent back to the sending server 114.

Messages that are subject to deferral are only deferred for some amount of time (typically 30 to 60 minutes). This is a test that the sending server 114 is "well-behaved". Many servers that send spam do not process deferred messages, thus deferred messages will not be resent from such sources.

Using a typical queue scheduler, each inbound message is processed by the product's Message Translation module 104, which deposits into the delivery queue 106 either:
  the message "as is", or
  the message with some level of additions, modifications or other translation, to be described hereinafter The delivery queue 106 will deliver inbound messages to the internal e-mail infrastructure 100 of the enterprise or to an external destination 114. The delivery queue can use standard destination lookup mechanisms to resolve delivery locations (such as Domain Name Service DNS) or a routing table that sends mail to known internal domains to the internal e-mail infrastructure 100 and everything else to the Internet 114.

Figure 2:
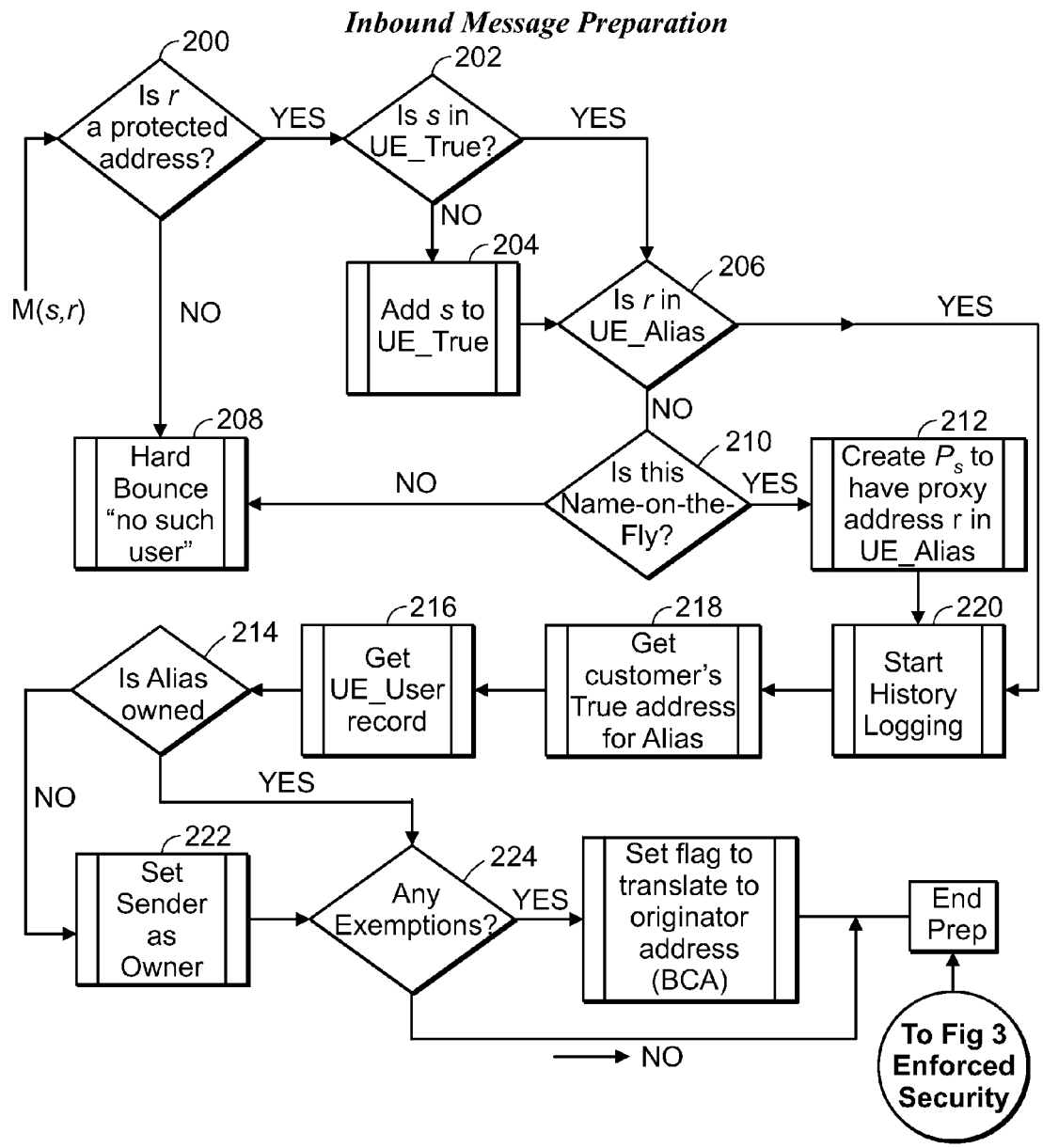
FIG. 2 is a flowchart diagram that illustrates how the database is populated from e-mail traffic and other preliminary steps followed in the preferred embodiment prior to enforcement of the security module.

FIG. 2—Inbound Message Preparation

The following is a legend corresponding to elements illustrated in FIG. 2:

Legend: s=sender identity
  r=recipient identity
  M(s,r)=A message from s to r
  UE_TRUE is a database table containing "real" (i.e. non-proxy) addresses
  UE_ALIAS is a database table containing proxy addresses
  UE_User is a databse table containing user information
  BCA="Business Card Address", the originator address managed by the internal mail transport agent (i.e. mail server)

$P_s$ is the security settings for the proxy address registered to s for user that owns originator address to which proxy r is a substitute As the product processes mail, it updates the database with new proxy addresses, volume statistics and historical tracking FIG. 2 details the database preparations that are made during the receipt of an inbound message in the preferred embodiment.

Inbound message preparation takes place before the security disposition is returned on a given message.

The first thing that is examined on an incoming message is whether or not the recipient address is at a domain that is being protected by Reflexion 200.

It is important to note that a message that arrives at Reflexion must either be sent to an address whose domain is being protected by Reflexion ("inbound"), or be sent from such an address ("outbound"). Local mail should be delivered locally; therefore Reflexion should never see e. mail to and from addresses at the same domain.

It is possible for mail to be sent from one enterprise to another and have both enterprises' domains be hosted on a single Reflexion installation. In this case, the message is first processed as an outbound message from the first enterprise and then is treated as an inbound message to the second enterprise.

If the sender's address has never been encountered by this installation of Reflexion 202, it is added to the database table of "true addresses" 204.

Next, the product searches the database to see if the recipient address is an issued proxy address 206.

If the alias does not exist, it is still possible that the address was created through the naming convention known as, "Name-on-the-Fly" (NOTF) 210, in which case the proxy address should be created and registered to the protected user based on information drawn from the naming convention 212. If NOTF is not permitted for the unknown proxy address, the message is rejected 208.

At this point, the proxy address exists in the database. Start tracking the result of the message for the history system 220.

To find the user for which the proxy serves as a substitute, it's necessary in the preferred embodiment to navigate first to the user's original address 218 then from there to the user records 216. In other embodiments, this can be accomplished using numerous other strategies, however, it is necessary to have in hand the identity of the user in order to proceed.

If the proxy address is unregistered to any given user 214, then register it to the current sender 222. This condition can occur due to two possible conditions. First, the proxy address was just created using NOTF, and is thus un-owned. Second, proxy addresses can be explicitly created prior to being used, in which case it is un-owned until the first use, and wherein it becomes registered to the first user 222 just as with NOTF proxies.

The sender's exemption status is then checked 224 to provide information to the Reflexion Security Module and also the Address Translation Module. Exempt senders are not subject to access control and all mail to and from exempt contacts are conducted under the original internal address of the protected user.

Figure 3:
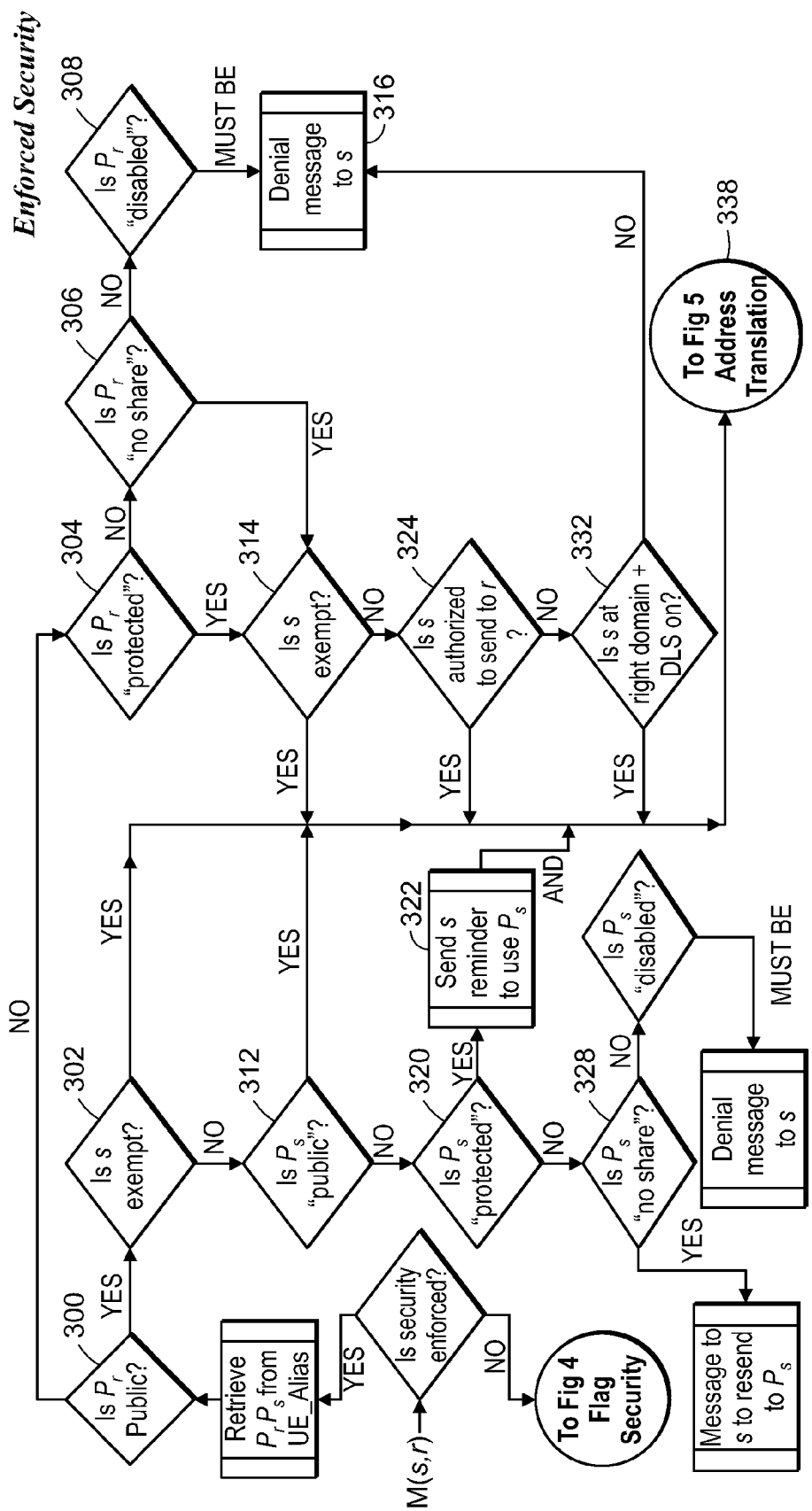
FIG. 3 is a flowchart diagram that illustrates the logic and behavior of the Security Module of the preferred embodiment when the product is operated in Enforce Mode.

FIG. 3—Enforced Security

The following is a legend corresponding to elements illustrated in FIG. 3:

---
Legend:

s = sender identity
r = recipient identity
$P_s$ is the security settings for the proxy address registered to s for user that owns proxy r
$P_r$ is the security settings for the proxy address r
M(s, r) = A message from s to r
UE_Alias a database table containing proxy addresses
DLS stands for Domain Level Sharing

---

Note:
It is possible for $P_s$ to be the same object as $P_r$.

Once inbound message preparation is completed, Reflexion will determine the security disposition for this message.

There are two active security modes available to Reflexion users; Enforced Mode and Flag Mode.

FIG. 3 details the logic followed by the preferred embodiment security model for messages sent to a user that employs Enforced Mode.

By definition, all inbound mail to domains protected by Reflexion are proxy identifiers, even if the recipient address is indistinguishable from the original, internal address. Each original, internal address has a proxy address with the same address in order to permit security to be placed on the original address itself The security state of the recipient address is interrogated first.

Message to a Public Proxy

If the recipient proxy address has a security status of "public" 300, then check for the sender's exempt status 302. If the sender is exempt, security is bypassed and the message is passed on to subsequent message translation stages and delivered 338.

If the proxy address that is registered to the sender is not the same as the proxy address used as the recipient address for this message (this is not stated clearly in the figure, but is the case), the product will examine the security set on the proxy of the sender before permitting delivery.

If the proxy assigned to the sender is public 312 or protected 320, the message is allowed through security 338. The sender is sent a reminder message to use their own proxy address in the future 322 if the proxy that is registered to them is protected.

If the sender's proxy is "no share" 328, the message is not allowed to be delivered. Instead, the sender is sent back a request that the sender resend the message using the proxy address registered to the sender (as opposed to proxy used as the recipient in this message).

So even if a message is sent to public proxy address, the security state of the sender's proxy address can alter, or prohibit, the delivery of the message.

Message to a Protected Proxy

If the recipient proxy address has a security status of "protected" 304, then check to see if the sender is permitted to send mail to this proxy address.

Currently, there are three ways that a sender can be authorized to use a protected proxy. First, if the sender is exempt 314 then security is bypassed and the message is passed on to subsequent message translation stages and delivered 338. Second, if the sender is the party that is registered to the proxy address 324, delivery is authorized and completed 338. Finally, if the sender is from the same domain as the contact that is registered to the proxy address and the domain is not one of the major ISPs such as AOL, Yahoo, Hotmail, etc. (a configurable list), and the security property that permits domain-level sharing is enabled on the proxy 332, the message is authorized for delivery 338.

Senders that are not authorized to use a protected proxy are sent a request that the message be resent to the proxy address that is permitted for use by the sender 316. This message essentially states that "proxy address x has been changed to the sender's proxy address y. Please resend your message to y".

Protected addresses are used to protect against spam that has no valid return address, but to afford legitimate contacts a resend mechanism that will let messages be delivered.

Message to a No Share Proxy

If the recipient proxy address has a security status of "no share" 306, then check to see if the sender is permitted to send mail to this proxy address.

Currently, there are three ways that a sender can be authorized to use a protected proxy. First, if the sender is exempt 314 then security is bypassed and the message is passed on to subsequent message translation stages and delivered 338. Second, if the sender is the party that is registered to the proxy address 324, delivery is authorized and completed 338. Finally, if the sender is from the same domain as the contact that is registered to the proxy address and the domain is not one of the major ISPs such as AOL, Yahoo, Hotmail, etc. (a configurable list), and the security property that permits domain-level sharing is enabled on the proxy 332, the message is authorized for delivery 338.

Senders that are not authorized to use a protected proxy are sent a denial of delivery message that gives no recourse for resending the message. 316. The difference between unauthorized use of a protected address versus unauthorized use of a no share address is that protected proxy denials provide a means for successfully resending the message while no share denials do not.

With no share proxies, the requirement to successfully send an e-mail message is raised from simply knowing the recipient address to knowing both the recipient and the corresponding sender address that is registered to the proxy. No share proxies provide security-conscious organizations a very effective yet lightweight protection against what are known as "directory harvest attacks". Directory harvest attacks are a technique used to gather live e-mail addresses by sending messages to large numbers of different addresses at the targeted domain. Whatever addresses do not result in a "no such user" are assumed to be valid.

With no share proxies, directly harvests will fail unless the sender knows to spoof the correct sender's address in each attempt.

Message to a Disabled Proxy

If the recipient proxy address has a security status of "disabled" 308, then check to see if the sender is exempt, for that is the only way that a message to a disabled proxy can be delivered if the user employs Enforce Mode security.

Figure 4:
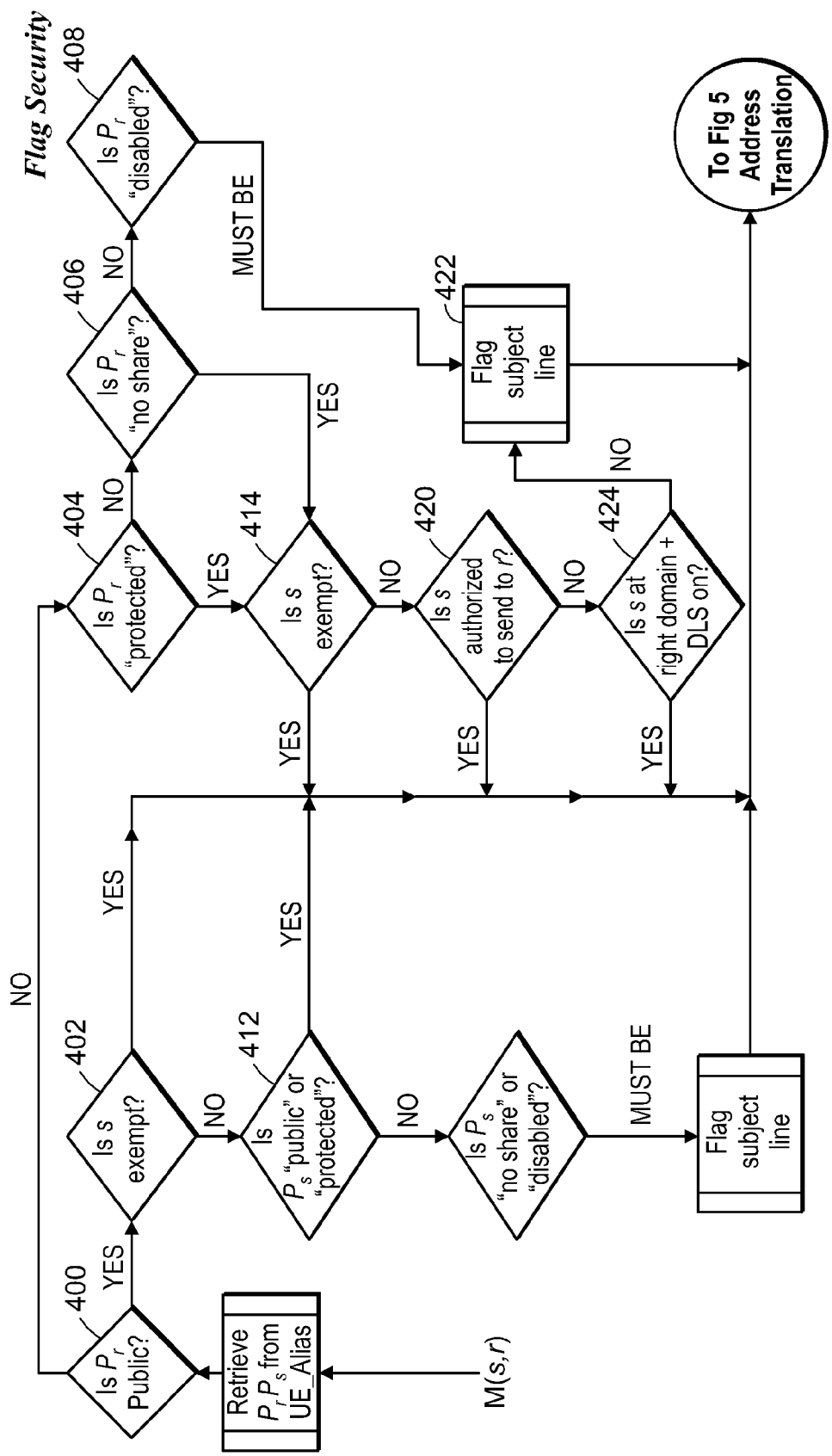
FIG. 4 is a flowchart diagram that illustrates the logic and behavior of the Security Module of the preferred embodiment when the product is operated in Flag Mode.
Figure 6:
FIG. 6 Login Page
FIG. 7 Contacts List
FIG. 8 Contact Details Page
FIG. 9 Reflexion User Options Page
FIG. 10 Administrator Add a Global Exemption Page
FIG. 11 Administrator Create New User Page
Figure 7:
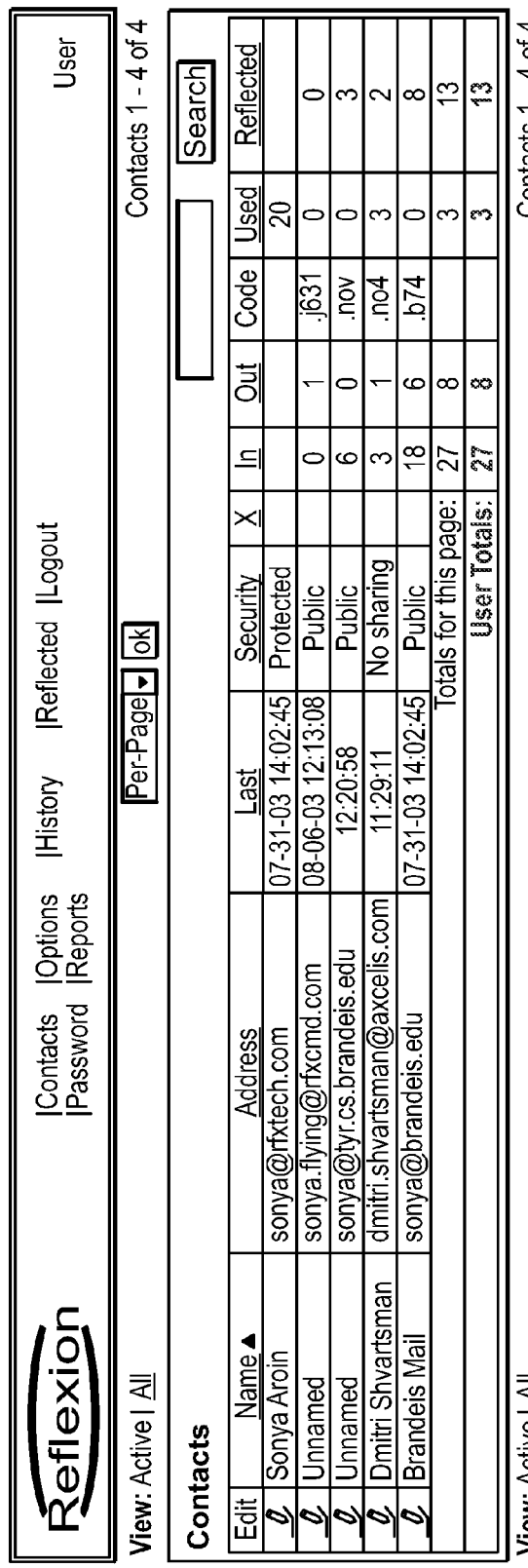

FIG. 4—Flag Security

The following is a legend corresponding to elements illustrated in FIG. 4:

| Legend: |
|---|
| s = sender identity |
| r = recipient identity |
| $P_s$ is the security settings for the proxy address registered to s for user that owns proxy r |
| $P_r$ is the security settings for the proxy address r |
| M(s, r) = A message from s to r |
| UE_Alias is a database table containing proxy addresses |
| DLS stands for Domain Level Sharing |

Note:
It is possible for $P_s$ to be the same object as $P_r$.

FIG. 4 details the logic followed by the preferred embodiment security model for messages sent to a user that employs Flag Mode.

Flag Mode guarantees that all inbound messages will be delivered to the user's inbox.

The logic is almost the same as described for FIG. 3, the only material difference is that, in Flag Mode, whenever a sender is determined to be unauthorized to send a message to the recipient proxy, instead of sending a denial or retry message as would occur in Enforce Mode, the product will only flag the subject line with a prefix to indicate that the sender is unauthorized to send this message to the chosen proxy address 422/426.

It's important to note that the subject line flag is visible only inside the host enterprise; Reflexion removes the flag on replies to flagged messages on the way out of the enterprise.

Flag Mode serves three important product requirements:

1. Provides new users with a mode of operation for a smooth migration into using Reflexion, guaranteeing that no outside contact will ever be aggravated by Reflexion ("transition"). Pre-existing spam problems are cleared up in the new user's transition period.

2. Provides users with little or no tolerance for the blocking of legitimate but unexpected messages a guarantee that all mail will be delivered to the user's inbox. Flag Mode is ideal for those in the role of sales, business development or executive positions where a lot of business cards are handed out and the value and frequency of unexpected messages is high.

3. Users that do not or cannot change their e-mail behavior will operate the product permanently in Flag Mode. These users (or their administrator) can also inhibit the use of proxy addresses altogether, allowing the user to continue to use their one and only address as normal, yet still receiving spam relief How to Stop a Pre-Existing Spam Problem A new user that begins using the product, who has a pre-existing spam problem, can end spam being sent to the existing address in the following manner:

1. Configure overall security enforcement to Flag Mode.

2. Exempt all known contacts using any of the various embodiments of exemption methods. Exempting contacts allows legitimate contacts that are already dependent on the original, internal address to continue to use it unabated.

3. Increase security on the proxy that has the same address as the original, internal address. This will cause any mail sent to that proxy to be flagged unless the contact is on the exempt list. This is a non-aggressive form of "white listing", a common technique that is very effective at blocking spam but which has shortcomings that limit wide scale adoption, particularly among businesses. Reflexion only employs this white list to stop a pre-existing spam problem. If a new user does not start with a spam problem, the white list is not required.

FIG. 5—Address Translations

Once an inbound message has been successfully cleared for delivery, most references to proxy addresses are translated to the corresponding original, internal addresses. There are some security states in the preferred embodiment that inhibit the translation of proxy addresses, specifically Name-on-the-Fly proxies.

NOTF proxies were defined by the user and, as such, reside in the name space of the user. Many times, NOTF proxy addresses are used in a login sequence or other process keyed by the NOTF proxy address. By inhibiting the translation of the NOTF within the body of an e-mail message (as opposed to the header of the message, which must be translated to ensure delivery of the message within the existing e-mail infrastructure), confirmation messages that specify the use of the NOTF proxy will be accurate (i.e. translation would make the information inaccurate).

When considering address translations, first understand that only proxy addresses at the domains protected by the individual Reflexion installation are candidates for translation. Addresses at non-protected domains are never translated.

Reflexion keeps a catalog of "true" addresses within the database. Both external addresses and internal, original addresses of the protected domains are stored in the true address catalog 500. Proxy addresses are found by seeking the proxy address itself as a key (e.g. proxy.123@company.com) or by seeking a proxy that is assigned to an outside contact for use a substitute to an internal, original address 502.

Given the true addresses of the sender and receiver, the corresponding proxy can be retrieved on outbound messages and substituted within the message for any and all references to the original, internal address.

Given the proxy address, the corresponding internal, original address can be retrieved on inbound messages and substituted within the message for any and all references to the proxy address.

Address translation becomes more complicated when the product also translates, for both inbound and outbound messages, proxy addresses of colleagues that may or may not exist, but which are created if necessary.

Exemption status adds another level of complexity, as e-mail to and from exempt contacts result in address translations being inhibited.

Additionally, some external contacts are dependent on a third-party proxy, so messages to those contacts should preserve the continuity of use of the proxy that is expected (i.e. the same proxy is presented to the same contact in all messages from the user to that contact).

To understand FIG. 5, it is very important to become comfortable with the syntax.

Read 504 as. "a translation method that takes some address 'a' and returns the correct translation for it".

Read 506 as, "a method that returns the proxy address that the outside contact expects to see", which is not always the same as the proxy addressed assigned to the contact.

Benefits of the Invention

The primary benefit of the invention is that undesired messages can be prevented, with great precision, from being delivered to identifiers that are protected by Reflexion.

Since Reflexion does not filter e-mail, physical bandwidth can be saved (and the associated costs) when Reflexion rejects messages during SMTP receipt of inbound traffic.

Also, Reflexion does not suffer from "false positives". The security model is consistent and always under the control of the user or host enterprise.

Reflexion also saves money on the archiving of e-mail, since there is less spam to store.

Reflexion can reveal things that occur in electronic communications but which are difficult to see. For example, in e-mail, Reflexion detects the sharing of an e-mail address between parties, and can also detect when someone is authoring mail using a corporate e-mail address without sending the message out through the corporation's infrastructure (thus bypassing whatever security and controls are in place).

What is claimed is:

1. A method for selectively allowing or denying access to a recipient user coupled to an electronic communications network by other users coupled to the electronic communication network, said recipient user having an associated recipient identifier, comprising the steps of:
    A. generating, by a security module, a plurality of proxy identifiers associated with said recipient user, each of said proxy identifiers having at least three associated security states,
        a first of said states being indicative of allowing any other user coupled to said electronic communication network access to said recipient user,
        a second of said states being indicative of denying any other user coupled to said electronic communication network access to said recipient user, and
        a third of said states being conditionally indicative of allowing at least one but fewer than all other users coupled to said electronic communication network access to said recipient user if predetermined criteria are met and denying access to said recipient user otherwise;
    B. receiving, by a receiver, an inbound message from a sender user coupled to said electronic communication network, said inbound message including a sender identifier and said recipient identifier, said sender identifier being associated with the sender user of said inbound message, said recipient identifier derived from a proxy identifier associated with recipient user, and said recipient identifier selected by said recipient user or a sender user and transferring said inbound message to a location associated with one of said proxy identifiers;
    C. processing, by the security module, said transferred inbound message in said location to evaluate a security status associated therewith using said sender identifier and said recipient identifier, and
    D. allowing, by the security module, access for said transferred message in said location to said recipient user when said security status meets one or more predetermined criteria at least partially related to said security status of said one proxy identifier, and denying access for said transferred message in said location to said recipient user otherwise.

2. The method of claim 1, further comprising:
    E. pursuant to said evaluation, controlling by a queue storage communication, access for said inbound message to said recipient user by:
        i. allowing communication access for said inbound message to said recipient user when said security status corresponds to said first state;
        ii. denying communication access for said inbound message to said recipient user when said security status corresponds to said second state;
        iii. allowing communication access for said inbound message to said recipient user when said security status corresponds to said third state and meets one or more of said predetermined criteria at least partially related to said security status of said one of said proxy identifiers, and denying communication access for said transferred inbound message to said recipient user otherwise.

3. The method of claim 1, wherein processing said inbound message includes attempting to match said sender identifier with at least one of a plurality of identifiers associated with contacts of the recipient user.

4. The method of claim 1, wherein processing said inbound message includes assigning said recipient identifier to at least one of a plurality of identifiers associated with contacts of the recipient user.

5. The method of claim 1, wherein processing said inbound message includes assigning said recipient identifier to at least one contact of the recipient user.

6. The method of claim 1, wherein said sender identifier is an e-mail address and said recipient identifier is an e-mail address.

7. The method of claim 1, wherein the recipient identifier is valid for a predefined time period.

8. The method of claim 7, wherein the recipient identifier expires after the predefined time period.

9. The method of claim 1, wherein processing said inbound message includes rejecting said inbound message if the recipient identifier is not assigned to the proxy identifier.

10. The method of claim 1, wherein processing said inbound message includes determining the security state associated with said sender user.

11. The method of claim 1, wherein processing said inbound message includes determining if said recipient user initiated generation of a proxy identifier included in said inbound message.

* * * * *